US012501176B2

(12) United States Patent
Bales et al.

(10) Patent No.: US 12,501,176 B2
(45) Date of Patent: Dec. 16, 2025

(54) DATA COLLECTION BY A DYNAMIC AREA OF INTEREST CAMERA TECHNIQUE

(71) Applicant: Clarity.GolfInc., Whitehouse, OH (US)

(72) Inventors: William Bales, Whitehouse, OH (US); Craig van Vliet, Whitehouse, OH (US)

(73) Assignee: Clarity Operations Inc., Whitehouse, OH (US)

( * ) Notice: Subject to any disclaimer, the term of this patent is extended or adjusted under 35 U.S.C. 154(b) by 50 days.

(21) Appl. No.: 18/411,764

(22) Filed: Jan. 12, 2024

(65) Prior Publication Data

US 2024/0244337 A1    Jul. 18, 2024

Related U.S. Application Data

(60) Provisional application No. 63/479,751, filed on Jan. 13, 2023.

(51) Int. Cl.
*H04N 23/90* (2023.01)
*A63B 69/36* (2006.01)
*H04N 23/60* (2023.01)
*H04N 23/611* (2023.01)

(52) U.S. Cl.
CPC ......... *H04N 23/90* (2023.01); *A63B 69/3658* (2013.01); *H04N 23/611* (2023.01); *H04N 23/64* (2023.01); *A63B 2220/05* (2013.01); *A63B 2220/35* (2013.01); *A63B 2220/806* (2013.01)

(58) Field of Classification Search
None
See application file for complete search history.

(56) References Cited

U.S. PATENT DOCUMENTS

| | | | | |
|---|---|---|---|---|
| 11,716,449 B1 | * | 8/2023 | Vaziri | G06F 3/013 |
| | | | | 348/158 |
| 2002/0102101 A1 | * | 8/2002 | Pelletier | G08B 13/19643 |
| | | | | 348/E7.086 |
| 2008/0165359 A1 | * | 7/2008 | Mattox | G01J 4/04 |
| | | | | 356/367 |
| 2010/0210377 A1 | | 8/2010 | Lock | |
| 2011/0299729 A1 | | 12/2011 | Dawe et al. | |

(Continued)

FOREIGN PATENT DOCUMENTS

KR    101374139    3/2014

OTHER PUBLICATIONS

Huang, K., "Dynamic context capture and distributed video arrays for intelligent spaces", IEEE Transactions on Systems, Man and Cybernetics. Part A: Systems and Humans, IEEE Service Center, NJ, vol. 35(1), pp. 145-163, (Jan. 2005).

*Primary Examiner* — Edemio Navas, Jr.
(74) *Attorney, Agent, or Firm* — William J. Clemens; Shumaker, Loop & Kendrick, LLP (57) ABSTRACT

A method of data collection for cameras applicable to any sport where a greater understanding of fluid movement can be obtained by having a faster frame per second or greater resolution for certain parts of a scene. The method coupling a computer to a first stage camera and a second stage camera, focusing said first stage camera on a defined dynamic area of interest, directing said second stage camera on a reduced area of interest, replacing certain data collected from the first stage camera with data collected from the second stage camera, and outputting a compilation onto a display.

11 Claims, 4 Drawing Sheets

(56) References Cited

U.S. PATENT DOCUMENTS

| | | | |
|---|---|---|---|
| 2013/0305806 A1 | 11/2013 | Saito et al. | |
| 2015/0057108 A1* | 2/2015 | Regimbal | H04M 1/72427 |
| | | | 473/407 |
| 2021/0197810 A1* | 7/2021 | LeBeau | H04N 23/23 |
| 2022/0192606 A1* | 6/2022 | Chappell | A61B 5/0064 |
| 2023/0008567 A1 | 1/2023 | Zikos et al. | |
| 2023/0199295 A1* | 6/2023 | Jansson | G01S 3/7864 |
| | | | 348/46 |
| 2023/0408696 A1* | 12/2023 | Del Los Santos | G01S 17/66 |

* cited by examiner

DATA COLLECTION BY A DYNAMIC AREA OF INTEREST CAMERA TECHNIQUE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/479,751, entitled "IMPROVED DATA COLLECTION BY A DYNAMIC AREA OF INTEREST CAMERA TECHNIQUE", filed Jan. 13, 2023. The contents of the above referenced application are incorporated herein by reference in its entirety.

FIELD OF THE INVENTION

The field of the invention is data collection and in particular to a method of improving data collection by processing a dynamic area of interest with cameras providing faster frame per second and/or greater resolution for certain parts of a scene.

BACKGROUND OF THE INVENTION

In all sports there is a desire to improve the performance of the participant and data capture is an ever increasing field of study. Digital cameras have made data capture possible wherein individual frames can be viewed for use in analyzing performance. However, current camera systems collect data from a whole region at the same frame per second. The result omits areas that have not changed or have little significance.

Camera visual feedback can benefit a wide range of sports by providing detailed insights into athletes' performances. For instance, camera visual feedback can be particularly valuable for improving an athlete's game of golf. Cameras can be used in golf to monitor ball trajectory, swing mechanics, and overall performance. This visual feedback provides a valuable tool for golfers and coaches in refining skills and addressing specific aspects of a golfer's game.

Cameras are beneficial in the game of baseball to analyze pitching techniques, batting swings, and fielding movements. The camera and data collection can help players and coaches assess the biomechanics of a swing, identify flaws, and refine pitching mechanics.

In soccer, cameras can be used to analyze players' movements, positioning, and ball control. Coaches can use visual feedback to help players improve their passing accuracy, shooting techniques, and overall tactical awareness.

Cameras are beneficial in basketball for analyzing shooting form, dribbling techniques, defensive strategies, and overall player movements on the court. This feedback can help improve shooting accuracy, identify defensive weaknesses, and enhance overall team performance.

Tennis players and coaches use cameras to review and analyze serving techniques, ground strokes, and footwork. Visual feedback helps identify areas for improvement in a player's game and allows for more effective coaching.

Cameras can capture the intricate movements of gymnasts, aiding coaches in evaluating routines, form, and execution of skills. This visual feedback is crucial for refining techniques and ensuring safe and precise performances.

In track and field events, cameras can be used to analyze running techniques, jumping mechanics, and throwing motions. This visual feedback helps athletes optimize their form and coaches to make specific training recommendations.

In volleyball, cameras can capture player movements, serving techniques, and spiking mechanics. Coaches can use this visual feedback to analyze player performance, make tactical adjustments, and enhance team coordination.

In essence, camera visual feedback is versatile and can be applied to various sports to enhance training, improve technique, and optimize overall performance. The cameras and processes of the instant invention can be applied to the above sports and others not named. For purposes of this disclosure, examples will be set forth directed to the game of golf but it is understood that the advancements in technology provided herein can be applied to any of the named sports, or the like sports that would benefit from camera visual feedback such as slow-motion analysis and motion tracking.

SUMMARY OF THE INVENTION

Disclosed is a method of improving data collection by processing a dynamic area of interest (AOI). Dynamic AOI is utilizing a lower frame rate camera to determine an area of interest, then other cameras that take up a reduced field of view using a high frame rate which are instructed which pixels to narrow down the region of interest to and take that image or image capture. This allows much more detailed processing as it is a higher spatial or temporal resolution in a much smaller area.

Multiple cameras are utilized to capture the scene. At least one camera covers a general area and at least one high speed camera processes the areas of interest dynamically at either a higher frame rate, greater resolution or a combination of both to obtain improved results. The method has a particular advantage in regards to sports where a participant is looking to analyze individual movement for purposes of enhancing physical or apparatus performance. The present invention relates to any sport where a greater understanding can be obtained by having a faster frame per second or greater resolution for certain parts of the scene. An important use case is in golf, to monitor the launch of a ball to accurately measure the ball's trajectory and spin when struck with a golf club.

The use of cameras in monitoring golf ball trajectory and spin offers several benefits for both players and coaches. Here are some of the key advantages: Cameras are used to capture the entire trajectory of the golf ball with great precision. This allows for accurate analysis of the ball's flight, spin, and other crucial parameters, providing more detailed and reliable data compared to traditional methods. Cameras can provide quantitative data on various aspects of the golf ball's motion, such as launch angle, spin rate, and initial velocity. This data can be essential for understanding the mechanics of a golfer's swing and ball flight, helping players and coaches make informed decisions about swing adjustments and equipment choices. By combining camera footage with other technologies, such as motion capture systems, analysts can study the golfer's biomechanics in detail. This allows for a comprehensive understanding of how body movements impact ball flight, helping golfers optimize their swings for better performance.

Cameras enable golfers and coaches to visually review each shot. This real-time feedback can aid in identifying flaws in the golfer's technique, allowing for immediate corrections. The visual component is especially helpful for conveying information to the player and making adjustments on the spot. The ability to record and review shots over time allows golfers to track their progress and identify patterns in their performance. This information is valuable for refining skills, addressing weaknesses, and enhancing overall proficiency in the game.

The data collected from cameras can be used to create computer simulations and models of ball flight. This can aid in predicting how changes in technique, equipment, or environmental conditions may affect the trajectory and spin of the golf ball, helping golfers make more informed decisions. Coaches can use camera footage to analyze a player's performance in detail. This facilitates targeted coaching, allowing instructors to provide personalized advice and drills to improve specific aspects of a golfer's game. Computer simulations are also possible wherein a computer simulation can be made of a player making the motion to cause the ball flight, 3D models can be created of people from images.

The use of cameras in monitoring golf ball trajectory and spin contributes to a more data-driven approach to golf instruction and performance improvement. It enhances the learning experience for both players and coaches, leading to more effective training and better results on the golf course.

An objective of the invention is to provide a technique that will support greater accuracy of capture, in more varied conditions and across many sporting disciplines.

Still another objective of the invention is to provide a technique that will support greater accuracy of capture, in more varied conditions and across many sporting disciplines. The technique can be combined with pose technology or tracking systems to create an improved result.

Yet another objective of the invention is to provide a system that can be used indoors and outdoors, in varying light conditions.

Another objective of the invention is to provide a dynamic area of interest technique that can be used in conjunction with pose estimation to highlight the joint complexes.

Still another objective of the invention is to provide a dynamic area of interest technique that can be used for extracting more accurate spin and trajectory data in a golf launch monitor, and from golf balls that do not have fiducials somewhere within. Club head data from a golf club, tennis racquet, and the like can be collected.

Yet still another objective of the invention is to provide a dynamic area of interest technique that can be used for increasing the accuracy of line calls in sports like tennis.

An advantage of the invention is to provide a technique for use in any sport where a greater understanding can be obtained by having a faster frame per second or greater resolution for certain parts of a scene.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Detailed embodiments of the instant invention are disclosed herein, however, it is to be understood that the disclosed embodiments are merely exemplary of the invention, which may be embodied in various forms, Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
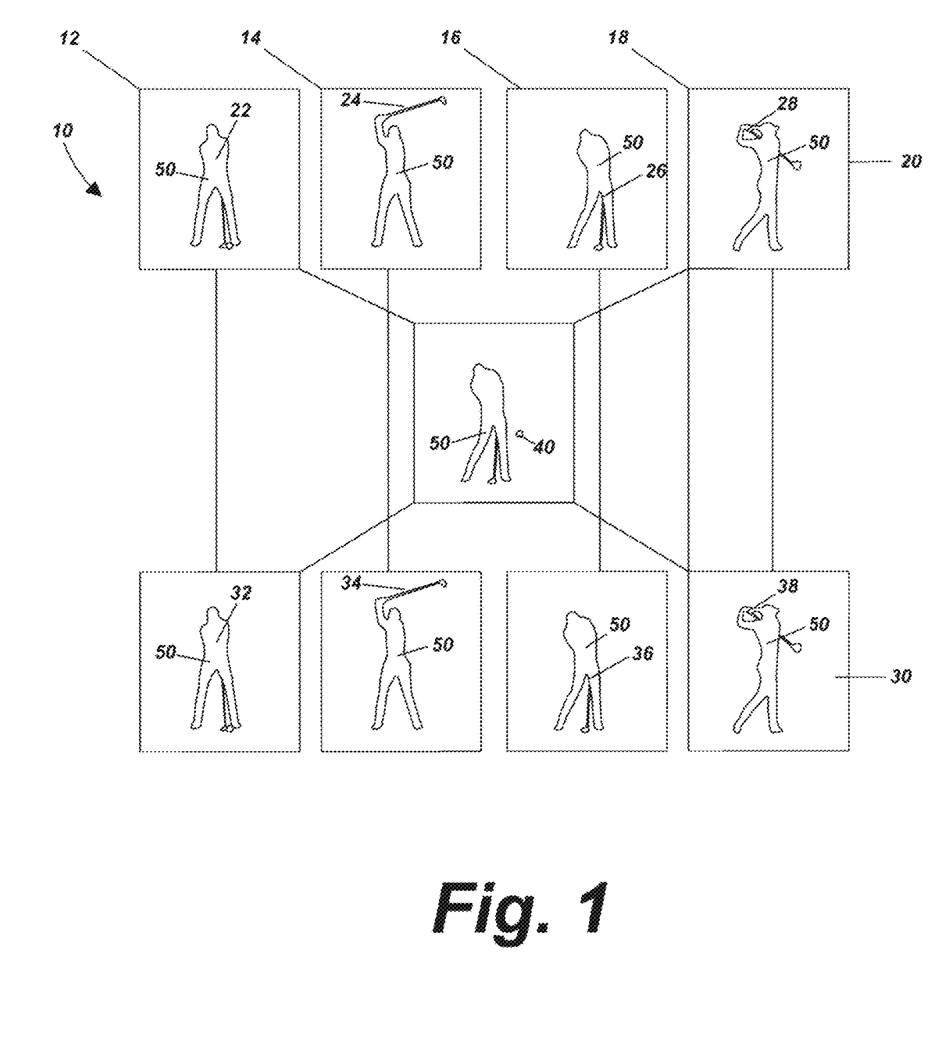
FIG. 1 is a pictorial view of the dynamic area of interest technique.

Referring to FIG. 1, depicted is a field of view 10 of a golf swing captured by two video cameras. Frame 1 12, Frame 2 14, Frame 3 16, and Frame 4 18 from a first stage camera 20. The first stage camera 20 is used to scan the whole area, it could be an event based camera or a camera setup with binning, cross-sectional ROI, or combinations of both. The first stage camera 20 may also be a cheaper option with a lower frame rate, such as an RGB camera. The type of camera used is not limited.

Figure 2:
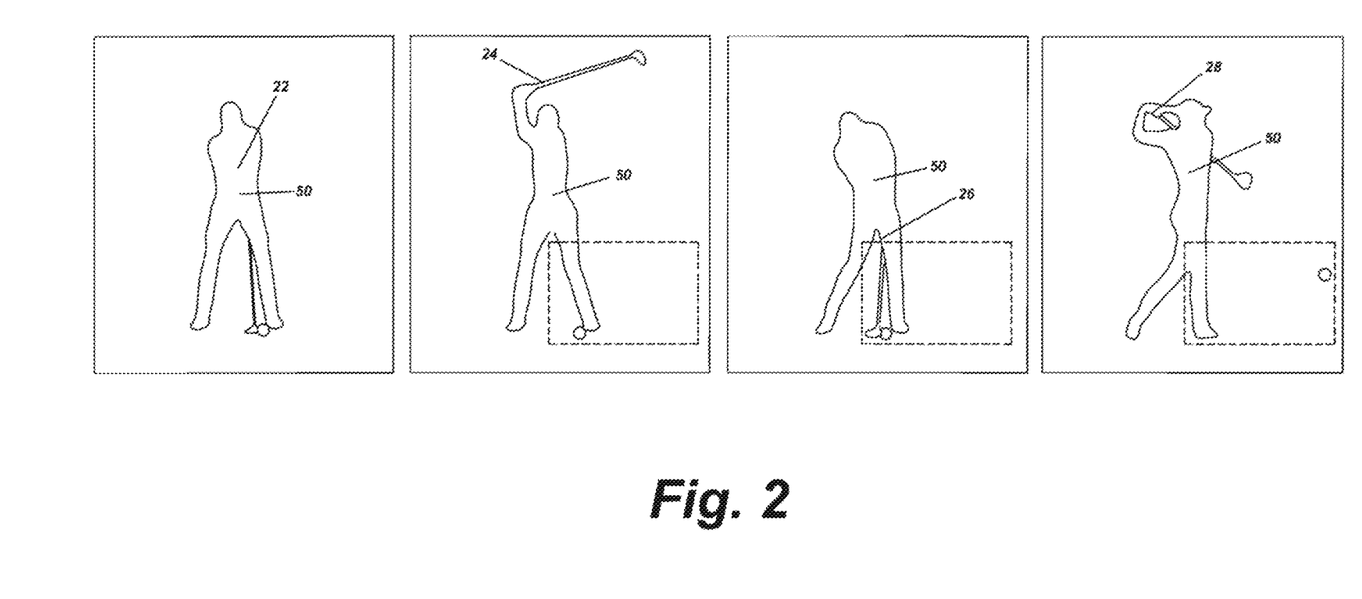
FIG. 2 is a pictorial view of a preferred embodiment of monitoring the launch of a ball.

The first stage camera 20 captures a wide field of view, known as a defined dynamic area of interest, encompassing the player's entire swing including the backswing and the downswing, as shown in FIG. 2. The field of view of the first stage camera 20 is designed to include the player as well as their club. The field of view of the first stage camera 20 is depicted in FIG. 2 with a solid rectangle. The first stage camera 20 captures at a lower frame rate which allows for a less expensive camera. An exemplary embodiment is a Lucid Vision Labs Atlas10 12.3 MP color model with an Edmund Optics C-mount ½" 8 mm f/1.8 lens, running in a default 89.7 frames per second at 12.3 megapixel resolution.

The first stage camera 20 captures the golf swing of the player 50 in frames and defines coordinates of the dynamic area, starting with an initial position depicted in Frame 12 showing the player 50 holding a golf club in a first position 22 known as addressing the golf ball; Frame 14 depicts the player 50 with a back swing of the golf club in a second position 24; Frame 16 depicts the player 50 down swinging the golf club in a third position 26 which is the golf ball impact; and Frame 18 depicts the player 50 following through with a swing in a fourth position 28.

The first stage camera 20 captures all the frames into a video feed and is connected to a computer having a microprocessor and a high speed interface. Using the microprocessor, a real-time computer vision algorithm processes the video feed to observe the player's motion. This can be achieved using a pose estimation algorithm such as MoveNet which efficiently tracks 17 body keypoints. When the player's swing reaches its lowest point and the club makes contact with the ball, a second stage camera 30 starts recording. The lowest point is based on the location of the player's hands, reaching their lowest vertical position during the golf ball impact.

In an exemplary embodiment, the hands of the player 50 are shown in a solid rectangle presented in Frames 32, Frame 34, Frame 36, and Frame 38 captured by the second stage camera 30. The second stage camera 30 has a reduced area of interest, even though it encompasses the same or similar area as the first stage camera 20.

The second stage camera 30 has a narrower field of view, known as a reduced dynamic area of interest, designed to capture the ball motion at launch. A professional player can strike a golf ball producing a speed of over 180 miles per hour and 10,000 revolutions per minute. To accurately capture the trajectory and rotation of the ball, a higher speed video camera is employed capable of high speed capture such as Single Photon Avalanche Diode (SPAD) sensors, event cameras and high speed RGB cameras. These cameras typically tradeoff spatial resolution for temporal resolution. An example embodiment uses a Prophesee event camera sensor as part of a SilkyEVCam HD Camera capturing data at 10,000 frames per second with 1280×720 pixel resolution.

The second stage camera 30 coordinates can be input directly or be attained with a model that predicts a path curve to have less granulation between frames, or it can be copied from a previous movement that is then repeated for the data take. The second stage camera 30 can have multiple modes. For a similar camera to first stage camera 20 due to the reduced AOI it can have a greater frame rate, a greater resolution, or a combination of both rate and resolution.

The data can be post fed into the same camera and the person repeats the same motion. As the first stage camera 20 is only finding the areas of interest, this operational mode is still valid for the data collection. The output format 40 ties the first stage camera 20 and the second stage camera 30 into the same time line. Using this method, a large area of interest is reduced to a much smaller area of interest after an event by use of the separate cameras. When applied to sports such as tennis, baseball or golf, it allows the user to look closely at a ball to calculate spin; look closely at line calls in tennis; look closely at how balls leave the hand from a pitcher or when struck by a golf club.

For instance, at the frame rate and resolution in the narrow field of view, the golf ball is tracked to estimate linear velocity, and the movement of the dimples of the golf ball are used to estimate the ball's angular velocity (including rotational axis). Tracking is achieved using a fast object detector such as YOLOv8 on Frame 32 and fast template matching on subsequent frames 34, 36, 38. Finding the translation between two adjacent frames provides an estimate of the ball's linear velocity denoted as v in FIG. 3. The residual motion of the aligned images relates to the ball's angular velocity. This is estimated using an efficient Siamese neural network architect based on FastFlowNet. However, instead of estimating the full optical flow field, the decoder of the network is replaced with a simple regression layer which outputs the angular velocity directly as a three-dimensional vector, denoted as w in FIG. 3.

The method improves tracking and can be used to find balls and ball features in otherwise difficult scenarios. It can be low light, lack of color difference or a difficult background that make today's common techniques difficult to obtain accurate results. For instance, the improved method can: find the dimples in a golf ball; find clear tennis racquet strings; allow removal of background that is similar to the tracked product; provide depth sensing calculation with greater accuracy. The method can include using polarization to determine features, wherein using the dynamic area of interest allows better polarization.

Figure 3:
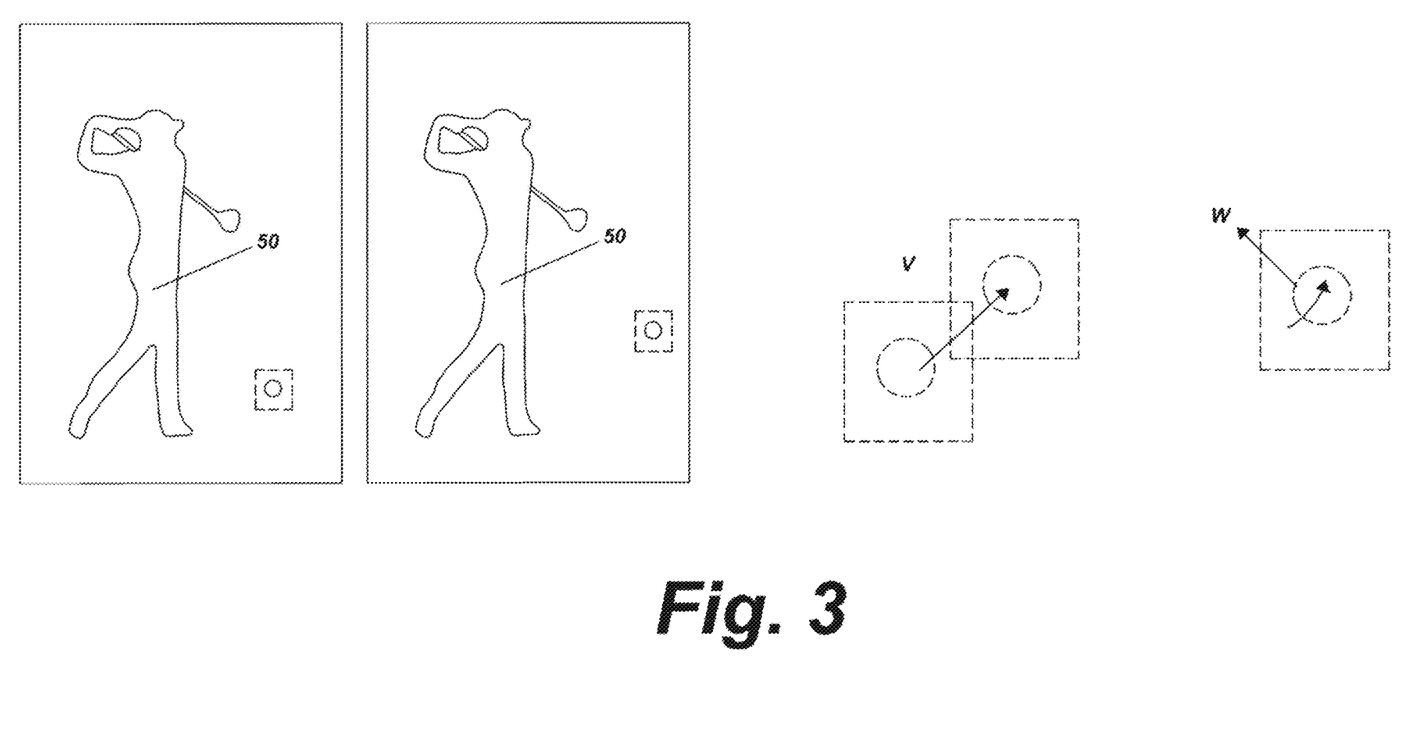
FIG. 3 is a pictorial view of the ball tracked on two successive frames.
Figure 4:
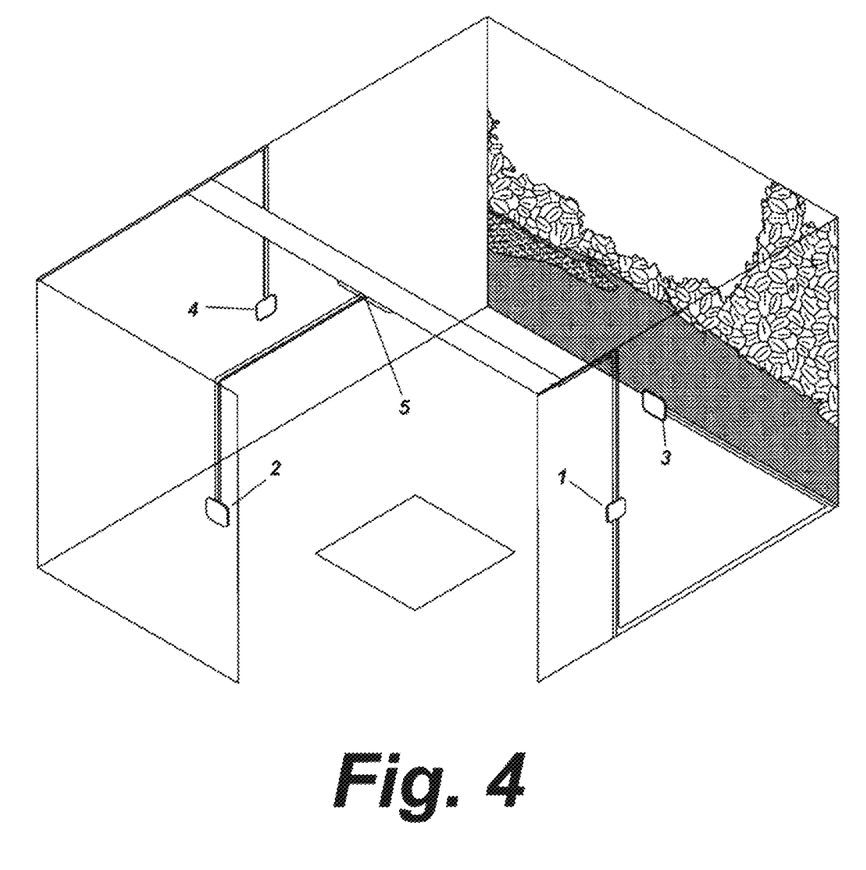
FIG. 4 is a perspective view of an example for camera mounting locations.

FIGS. 1, 2, and 3 depict a golfer 50 facing the camera at the beginning of the swing for simplicity. In practice, cameras can be mounted in different configurations. Some non-limiting example locations are shown in FIG. 4. Mounting the high-speed camera in a position orthogonal to the lower speed camera may be preferable to enable better localization and estimation in 3D of the ball position, as the cameras will have a wide baseline. For example, the high-speed camera could be at position 5 mounted on the ceiling, and the low speed camera at position 3.

Alternative embodiments may employ more than two cameras. Lower speed cameras are less expensive compared to high-speed cameras. For example, the high-speed camera could be mounted at position 5 and two low speed cameras could be in positions 1 and 4, or other configurations. For pose estimation, a preferred embodiment would have the lower-speed cameras in positions 1, 3, or 4 to minimize self-occlusions of the player's body.

Self-tracking can lead to a data pipeline that is faster than USB and many cameras can sit on this same data line. This allows cameras to be put nearly anywhere such as in a typical indoor golf scenario. Improved tracking allows a measured angle of attack by placing the camera 90 degrees to the path; can measure where the ball was hit by front facing cameras; allow new positions for cameras so the roof is not obstructed. For instance, one of the less realistic parts of indoor golf is playing out of the rough or from bunkers. Utilizing the above method allows one to know where the club hit the ground providing an accurate outcome of what happens on the golf course. The method may be pressure pad based and not camera based to create digital readouts for golf club fitting; add realism to indoor golf games; study bounce of club characteristics.

When using Gigabit Multimedia Serial Link (GMSL), cameras can be placed at calculated locations. For example, the camera can find where the club hit the ground. This allows determination of where the divot happened and its size. This information can be combined with the ball flight algorithm to model hitting of different surfaces and how much grass got in the way creating more accurate game play. By combining a series of GMSL cameras and faster acting region of interest cameras, tracking the ball flight and spin over a longer distance provide improved results to study the drag coefficient of golf balls. A variation of the ball flight tech is just one camera at the start and another camera placed where it is expected to land. The first camera lets the second camera know, preferably over Ethernet, to expect a ball wherein an accurate land angle and roll out is obtained.

Another application example is baseball pitcher technology which can be enhanced by adding force data in the form of 3D force plates having a one-inch barrier so that there can be dirt placed inside to represent a pitcher's surface. This force data, combined with the camera data, allows for the study of effectiveness of pitchers and prevention of injury.

Enhanced pose technology does not include a projectile component, rather the camera technology is fused with pressure pad data to create a much better representation of some of the finer feet movements to study, for example, the way ankles move to help prevent injury.

Regarding the sport of golf, to determine spin on a golf ball, a method is used to find the name on the golf ball or to find the dimples on the golf ball. For dimples, since golf balls are white, using color to find them does not work. The dimples do create a shadow but that is inconsistent under different conditions. Applicant employs polarization wherein light bounces off the golf ball to determine which angle the light comes from and how it bounced off the surface wherein the ridges in the golf ball create a difference in polarization. This requires four times the information to obtain the same data resolution as one would with a normal camera, the pixel is split into four sub pixels each finding different polarization angles. The dynamic area of interest can be used to obtain greater resolution. Polarization direction is used for dimples and the angle of the golf head or tennis racquet.

If polarization is insufficient, the previously mentioned technique of finding the name on the golf ball provides a fall-back position as a near constant capture method is created and the golf ball can perform a full revolution so the camera can locate the name on the golf ball again. Both methods may be employed together. A problem with the find the name method is the need to align the name with the camera to get the best results. In a driving range the balls will often have worn out or incomplete names. Further, the names on each golf ball may be different and different sizes. In the golf ball example, the golf ball impact is known, and the camera can capture the impact through the use of the dynamic area of interest. Frame based methods are limited to the frames per second of the capture device, wherein the dynamic area of interest has a much faster stream of information to determine events. This is not limited to impact, it could be any identifiable event, but in most cases impact serves as the example that makes sense. Impact for golf shot, impact for tennis serve, and so forth.

The method improves data collection for a dynamic area of interest by coupling a computer having a microprocessor to a first stage camera and a second stage camera, said second stage camera having a greater frame rate and/or a greater resolution than said first stage camera; focusing said first stage camera on a defined dynamic area of interest defining a first set of coordinates and capturing frames into a video feed connected to said computer having a high speed interface, wherein a real-time computer vision algorithm coupled to said computer processes said video feed to observe a player's motion; directing said second stage camera on a reduced area of interest defining a second set of coordinates; replacing said coordinates from said first camera with said coordinates from said second camera forming a compilation having the same time line; and outputting said compilation onto a display. A step of processing the reduced area of interest to encompass the same or a similar area of interest as the first stage camera in the same time frame enhances the clarity of the display.

The method includes the step of attaining a model that predicts a path curve to have less granulation between frames, or predicts a path curve copied from a previous movement that is then repeated for the data taken.

Polarization can be used to determine features wherein the dynamic area of interest is enhanced by the polarization by determining which angle light bounces off the surface of an object, collecting data, and splitting said data into four sub pixels each finding different polarization angles.

Improved tracking is possible by placing the first stage camera and the second stage camera 90 degrees with respect to each other, wherein the tracking measures a predefined location. The step of processing the dynamic area of interest and reduced area of interest using Gigabit Multimedia Serial Link (GMSL) cameras placed at calculated locations, wherein the GMSL cameras obtain accurate information from an indoor golf game such as bounce of club characteristics, the location of where the club hits the ground, and where a divot happened and its size.

The step of compiling information such as a ball flight algorithm flight algorithm modeling detects different surfaces such as how much grass got in the way. Tracking a name or dimples on a golf ball utilizing said second stage camera provides increased accuracy.

The method includes a step of estimating linear velocity and the rotational axis of a ball using a fast object detector and a fast template matching on subsequent frames. Multiple cameras separated by a wide baseline enable accurate 3D estimation.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for improving data collection for a dynamic area of interest comprising the steps of:
coupling a computer having a microprocessor to a first stage camera and a second stage camera, said second stage camera having a greater frame rate and/or greater resolution than said first stage camera;
focusing said first stage camera on a defined dynamic area of interest defining a first set of coordinates and capturing frames into a video feed connected to said computer having a high speed interface, wherein a real-time computer vision algorithm coupled to said computer processes said video feed to observe a player's motion;
directing said second stage camera on a reduced area of interest defining a second set of coordinates;
replacing said coordinates from said first camera with said coordinates from said second camera forming a compilation having the same time line;
estimating linear velocity and the rotational axis of a ball using an object detector and a template matching on subsequent frames in conjunction with the coupling said first stage camera and said second stage camera and directing of said second stage camera onto the ball through said coordinates coordinated by said first stage camera and the combination of imaging from both cameras onto an imaged scene;

outputting said compilation provides faster frame per second and/or greater resolution for certain parts of said imaged scene.

2. The method according to claim 1 including the step of processing said reduced area of interest to encompass the same or a similar area of interest as said first stage camera.

3. The method according to claim 1 including the step of attaining a model that predicts a path curve to have less granulation between frames.

4. The method according to claim 1 including the step of attaining a model that predicts a path c copied from a previous movement that is then n peated for the data taken.

5. The method according to claim 1 including the step of using polarization to determine features, said dynamic area of interest enhancing said polarization by determining which angle light bounces off the surface of an object, collecting data, and splitting said data into four sub pixels each finding different polarization angles.

6. The method according to claim 1 including the step of improving tracking by placing said first stage camera and said second stage camera 90 degrees with respect to each other, wherein said tracking measures redefined location.

7. The method according to claim 1 including the step of processing said dynamic area of interest and said reduced area of interest using Gigabit Multimedia Serial Link (GMSL) cameras placed at calculated locations.

8. The method according to claim 1 herein the state of compiling includes a ball flight algorithm modeling the hitting of diff su aces and how much grass got in the way.

9. The method according to claim 1 including the step of tracking a name on a golf ball utilizing said first stage car and said second stage camera.

10. The method according to claim 1 including the step of tracking dimples on a golf ball utilizing said second stage camera.

11. The method according to claim 1 including the step of utilizing multiple cameras separated by a wide baseline to enable accurate 3D estimation.

* * * * *